(12) United States Patent
Nakanishi et al.

(10) Patent No.: US 10,031,285 B2
(45) Date of Patent: Jul. 24, 2018

(54) MULTICORE OPTICAL FIBER

(71) Applicant: SUMITOMO ELECTRIC INDUSTRIES, LTD., Osaka-shi, Osaka (JP)

(72) Inventors: Tetsuya Nakanishi, Yokohama (JP); Tetsuya Hayashi, Yokohama (JP); Takashi Sasaki, Yokohama (JP); Yoshiaki Tamura, Yokohama (JP); Tetsuya Haruna, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/683,915

(22) Filed: Aug. 23, 2017

(65) Prior Publication Data

US 2017/0351022 A1    Dec. 7, 2017

Related U.S. Application Data

(63) Continuation of application No. PCT/JP2016/057209, filed on Mar. 8, 2016.

(30) Foreign Application Priority Data

Mar. 25, 2015 (JP) .................. 2015-062668

(51) Int. Cl.
*G02B 6/02* (2006.01)
*G02B 6/44* (2006.01)
(Continued)

(52) U.S. Cl.
CPC ..... *G02B 6/02042* (2013.01); *G02B 6/02004* (2013.01); *G02B 6/02214* (2013.01); *G02B 6/03616* (2013.01); *G02B 6/3885* (2013.01)

(58) Field of Classification Search
USPC .......................................... 385/100
See application file for complete search history.

(56) References Cited

U.S. PATENT DOCUMENTS

| 4,094,689 A | 6/1978 | van Ass et al. |
| 4,573,762 A | 3/1986 | Joormann et al. |

(Continued)

FOREIGN PATENT DOCUMENTS

| EP | 2 511 741 A2 | 10/2012 |
| EP | 2 618 189 A1 | 7/2013 |

(Continued)

OTHER PUBLICATIONS

I. Ishida et al., "Possibility of Stack and Draw process as Fabrication Technology for Multi-Core Fiber," OFC/NFOEC Technical Digest, 2013, OTu2G.1, 3 pages.

(Continued)

*Primary Examiner* — Eric Wong
(74) *Attorney, Agent, or Firm* — Drinker Biddle & Reath LLP

(57) ABSTRACT

The present embodiment relates to an MCF having a low transmission loss and having a structure for reducing a transmission loss and effectively suppressing an inter-core XT. The uncoupled MCF includes alkali metal having a predetermined concentration in which each of a plurality of cores contributes to reduction in the transmission loss, and a core pitch is set so that a sum h_total of power coupling coefficients of a specific core and the remaining all cores of the plurality of cores is $2.3 \times 10^{-4}$/km or less.

8 Claims, 7 Drawing Sheets

(51) Int. Cl.
*G02B 6/38* (2006.01)
*G02B 6/036* (2006.01)

(56) References Cited

U.S. PATENT DOCUMENTS

| | | |
|---|---|---|
| 2013/0088771 A1 | 4/2013 | Li et al. |
| 2013/0243381 A1* | 9/2013 | Hayashi ............ G02B 6/02042 385/124 |
| 2013/0251320 A1* | 9/2013 | Hayashi ............ G02B 6/02042 385/100 |
| 2014/0168756 A1 | 6/2014 | Zhu |

FOREIGN PATENT DOCUMENTS

| | | |
|---|---|---|
| JP | S60-138503 | 7/1985 |
| JP | S60-176004 A | 9/1985 |
| JP | 2011-209702 A | 10/2011 |
| JP | 2012-162409 A | 8/2012 |
| JP | 2014-067020 A | 4/2014 |
| JP | 5545236 B2 | 7/2014 |
| WO | WO 2012/064579 A1 | 5/2012 |
| WO | WO-2014/038512 A1 | 3/2014 |

OTHER PUBLICATIONS

Katsunori Imamura et al., "Trench Assisted Multi-Core Fiber with Large Aeff over 100 μm2 and Low Attenuation Loss," ECOC Technical Digest, 2011, Mo.1.LeCervin.1, 3 pages.

Tetsuya Hayashi et al., "Multi-Core Fibers and Their Crosstalk Characteristics," OFC2012, TuC4.1, 2012, 2 pages.

Tetsuya Hayashi et al., "Very Low Crosstalk and Low Loss Multi-Core Fiber," The Institute of Electronics, Information and Communication Engineers, 2011 IEICE General Conference, p. 312, including English translation.

Jiajing Tu et al., "Design and analysis of large-effective-area heterogeneous trench-assisted", Optics Express, vol. 20, No. 14, Jun. 21, 2012, p. 15157-p. 15170, XP055344428.

Tetsuya Hayashi et al., "Characterization of Crosstalk in Ultra-Low-Crosstalk Multi-Core Fiber", Journal of Lightwave Technology, vol. 30, No. 4, Feb. 1, 2012, p. 583-589, XP011395652.

\* cited by examiner

*Fig.5A*

| | INTER-CORE XT @100km | h_total | TRANSMISSION LOSS CAUSED BY INTER-CORE XT |
|---|---|---|---|
| | (dB) | (/km) | (dB/km) |
| COMPARATIVE EXAMPLE (SCF) | — | — | — |
| SAMPLE 1 (MCF1) | -28.0 | $1.6 \times 10^{-5}$ | $6.9 \times 10^{-5}$ |
| SAMPLE 2 (MCF2) | -16.5 | $2.3 \times 10^{-4}$ | $9.8 \times 10^{-4}$ |

*Fig.5B*

| | INTER-CORE XT @100km | h_total | TRANSMISSION LOSS CAUSED BY INTER-CORE XT |
|---|---|---|---|
| | (dB) | (/km) | (dB/km) |
| COMPARATIVE EXAMPLE (SCF) | — | — | — |
| SAMPLE 1 (MCF1) | -20.0 | $9.9 \times 10^{-5}$ | $4.3 \times 10^{-4}$ |
| SAMPLE 2 (MCF2) | -9.4 | $1.2 \times 10^{-3}$ | $5.0 \times 10^{-3}$ |

*Fig.5C*

| | TRANSMISSION LOSS AT 1550nm | AMOUNT OF TRANSMISSION LOSS REDUCTION AT 1550nm |
|---|---|---|
| | (dB/km) | (dB/km) |
| COMPARATIVE EXAMPLE (SCF) | 0.161 | — |
| SAMPLE 1 (MCF1) | 0.158 | -0.003 |
| SAMPLE 2 (MCF2) | 0.157 | -0.004 |

MULTICORE OPTICAL FIBER

CROSS-REFERENCE TO RELATED APPLICATIONS

This application is a continuation application of PCT/JP2016/057209 claiming the benefit of priority of the Japanese Patent Application No. 2015-062668 filed on Mar. 25, 2015, the entire contents of which are incorporated herein by reference.

TECHNICAL FIELD

The present invention relates to a multicore optical fiber of an uncoupled type (referred to as MCF below).

BACKGROUND ART

Patent Document 1 discloses a technique for reducing a transmission loss of a MCF of which a plurality of cores is made of pure silica glass, and Patent Document 2 discloses a technique for reducing the transmission loss by adding alkali metal to the core. In addition, in Patent Document 3 discloses a structure in which each single core fiber is easily separated by employing a glass in which alkali metal easily melted by an acid or the like is doped, as a glass for covering the outermost peripheral surface of a plurality of single core fibers constituting a bunch fiber. A transmission loss of the MCF manufactured by the Stack and Draw process is described in Non-Patent Document 1, and a transmission loss of the MCF manufactured by the rod-in-collapse method is described in Non-Patent Document 2.

CITATION LIST

Patent Literature

Patent Document 1: Japanese Patent Application Laid-Open No. 2011-209702
Patent Document 2: Japanese Patent No. 5545236
Patent Document 3: Japanese Patent Application Laid-Open No. S60-176004

Non-Patent Literature

Non-Patent Document 1: I. Ishida, et al., "Possibility of Stack and Draw process as Fabrication Technology for Multi-Core Fiber", OFC2013, OTu2G.1
Non-Patent Document 2: Katsunori Imamura, et al., "Trench Assisted Multi-Core Fiber with Large $A_{eff}$ over 100 µm$^2$ and Low Attitude Loss", ECOC2011, Mo.1.LeCervin.1
Non-Patent Document 3: Tetsuya Hayashi, et al., "Multi-Core Fibers and Their Crosstalk Characteristics", OFC2012, TuC4.1

SUMMARY OF INVENTION

Technical Problem

As a result of examining a conventional MCF, the inventors have found the following problems.

That is, it has been known that addition of alkali metal elements to a core is effective for reducing a loss. However, the alkali metal elements tend to be more easily diffused than the other elements, and an alkali metal concentration in the core in the optical fiber decreases than the concentration at the preform stage during drawing of from the preform to the optical fiber. Therefore, there is a certain restriction on the alkali metal concentration that can contribute to structural relaxation of core glass during drawing. Especially, in a case of the related art in which the alkali metal is doped in only one core, high concentration alkali metal cannot be doped to prevent crystallization of a glass region corresponding to the core. In addition, in a case of an MCF having a plurality of cores, since the cores are arranged close to each other, it is necessary to suppress a transmission loss caused by a crosstalk (hereinafter referred to as XT) between the adjacent cores.

The present invention has been made to solve the above problems. An object of the present invention to provide an uncoupled MCF having a structure for reducing a transmission loss and effectively suppressing an inter-core XT.

Solution to Problem

The MCF according to the present embodiment is an uncoupled MCF that enables single mode transmission in individual cores, and includes a plurality of cores respectively extending in predetermined directions and a cladding for covering the plurality of cores. In particular, each of the plurality of cores includes alkali metal having a concentration sufficient for reducing the loss. In a cross section of the MCF orthogonal to a predetermined direction, a core pitch defined by the shortest distance between the centers of the adjacent cores of the plurality of cores is set so that the sum h_total of power coupling coefficients of a specific core and the remaining all cores of the plurality of cores is $2.3 \times 10^{-4}$/km or less.

Advantageous Effects of Invention

According to the present embodiment, it is possible to achieve both of reduction in a transmission loss in each core and reduction in a XT between adjacent cores.

BRIEF DESCRIPTION OF DRAWINGS

FIGS. 5A to 5C are diagrams of optical characteristics of the two samples 1 and 2 of the MCF according to the first embodiment (MCF 1 and MCF 2) and the comparative example (SCF).

DESCRIPTION OF EMBODIMENTS

[Description of Embodiments of Present Invention]

Figure 1A:
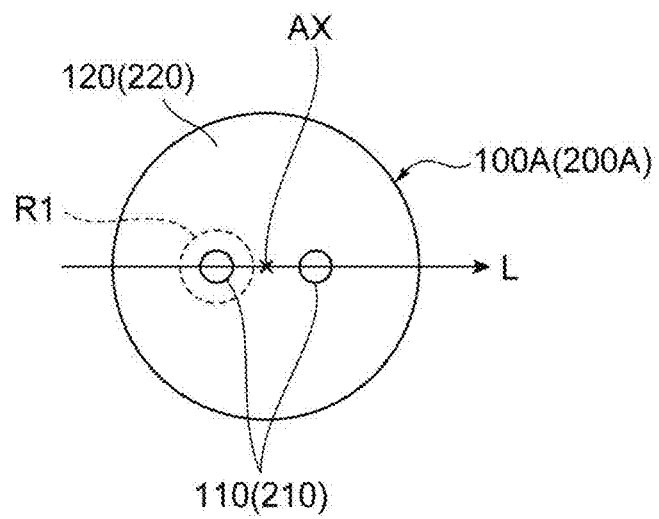
FIGS. 1A to 1C are diagrams of a sectional structure of a refractive index profile, and an alkali metal concentration distribution of a MCF and a preform according to a first embodiment.

First, embodiments of the present invention are described in a list.

(1) A multicore optical fiber (MCF) according to the present embodiment is an uncoupled MCF and includes a plurality of uncoupled cores which extends along a predetermined direction and enables single mode transmission in each core, and a cladding for covering each of the plurality of cores. In particular, as a first aspect, each of the plurality of cores includes alkali metal with a concentration sufficient to reduce a transmission loss. In the cross section of the MCF orthogonal to a predetermined direction, a core pitch defined by the shortest distance between the centers of the adjacent cores of the plurality of cores is set so that the sum h_total of the power coupling coefficients between a specific core of the plurality of cores and the remaining all cores is $2.3 \times 10^{-4}$/km or less. The specific core here is a core of which the sum h_total of the power coupling coefficients is maximized. Each core contains one or two or more kinds of alkali metals selected from among the group of lithium, sodium, potassium, and rubidium.

The present invention has been accomplished by founding that addition of the alkali metal to the core is effective for reducing the transmission loss even when the cores are arranged close to each other. That is, since the MCF according to the present embodiment has the plurality of cores, by using a core part of preform corresponding to the cores as a main source of an alkali metal doped region, the alkali metal is supplied to adjacent cores due to diffusion of alkali metal during drawing. Therefore, it is easy to set the concentration of the alkali metal in the core in the fiber during drawing to a value equal to or more than a value sufficient to reduce the transmission loss, and the MCF with a low transmission loss can be obtained by promoting relaxation of a glass structure in the fiber during drawing.

In the present embodiment, to allow the alkaline metal with the concentration sufficient to reduce the transmission loss to remain in each of the plurality of cores in the MCF, the plurality of alkali metal doped regions is provided in the preform before drawing having a cross section similar to that of the MCF, and reduction in the alkali metal concentration in the core during drawing is suppressed. That is, the MCF is obtained by drawing a preform along a predetermined direction, and the preform includes a plurality of core parts respectively corresponding to the plurality of cores, a cladding part corresponding to the cladding, and a plurality of alkali metal doped regions in which alkali metal is doped and which extends along the longitudinal direction. Depending on the arrangement of the plurality of alkali metal doped regions, it is not necessary to set the alkali metal doped regions to all the core parts.

(2) As a second aspect which can be applied to the first aspect, it is preferable that the core pitch be 45 μm or less.

(3) As a third aspect which can be applied to the first or second aspect, at least one alkali metal doped region may be provided in a region corresponding to the cladding in the preform for the MCF before drawing. In this case, in the MCF after drawing, it is preferable that a distance $\Lambda_{core\text{-}cladding}$ between a diffusion center position, corresponding to the center position of the alkali metal doped region in the preform, and a center position of the core adjacent to the diffusion center position of the plurality of cores be 45 μm or less.

(4) As a fourth embodiment which can be applied to at least one of the first to third aspects, each of the plurality of cores is made of $SiO_2$ glass having $GeO_2$ molecules of which a doping amount is 1 wt % or less, and the cladding is doped with fluorine. In this structure, it is preferable that the transmission loss of each of the plurality of cores at the wavelength of 1550 nm be less than 0.17 dB/km or less.

(5) As a fifth aspect which can be applied to at least one of the first to fourth aspects, in a structure in which germanium with a predetermined concentration is doped in at least one of the plurality of cores, it is preferable that the transmission loss of the core in which germanium is doped at the wavelength of 1550 nm be 0.18 dB/km or less.

(6) As a sixth aspect which can be applied to at least one of the first to fifth aspects, it is preferable that an average concentration of the alkali metal in each of the plurality of cores be 0.2 atom ppm or more and 50 atom ppm or less.

(7) As a seventh aspect which can be applied to at least one of the first to sixth aspects, in the preform for the MCF before drawing, it is preferable that an average concentration of the halogen elements in the region corresponding to each of the plurality of cores be 1000 atom ppm or more and 30000 atom ppm or less.

(8) As an eighth aspect which can be applied to at least one of the first to seventh aspects, it is preferable that the concentration of the alkali metal on the surface of the cladding be one atom ppm or less.

(9) As a ninth aspect which can be applied to at least one of the first to eighth aspects, it is preferable that a crosstalk (XT) when light with a predetermined wavelength is propagated for a certain length between the adjacent cores of the plurality of cores be −16 dB or less.

[Details of Embodiment of Present Invention]

Specific examples of the MCF according to the present invention are described in detail below with reference to the drawings. In the description on the drawings, the same element is denoted with the same reference numeral, and an overlapped description will be omitted. The present invention is not limited to these examples. It is intended that the present invention includes all the changes within an equivalent meaning and range to the claims indicated in claims.

(First Embodiment)

FIG. 1A is a diagram of a sectional structure of a preform 100A before drawing to manufacture an MCF 200A according to a first embodiment. The cross section illustrated in FIG. 1A is a cross section orthogonal to a central axis AX (coincide with a longitudinal direction of the preform 100A) of the preform 100A, and the preform 100A includes core parts 110 extending along the central axis AX and a cladding part 120 for covering each of the core parts 110. The MCF 200A is obtained by drawing the preform 100A, and the sectional structure thereof is similar to the sectional structure of the preform 100A. That is, the core 210 of the MCF 200A obtained by drawing the preform 100A corresponds to the core part 110 of the preform 100A, and the cladding 220 of the MCF 200A corresponds to the cladding part 120 of the preform 100A.

Figure 1B:
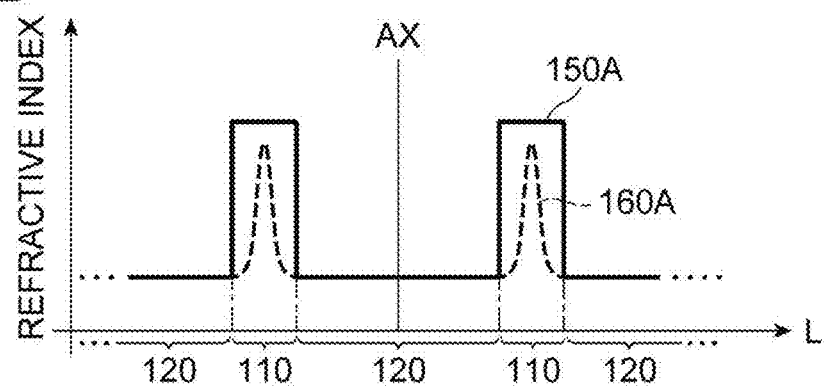

FIG. 1B is a diagram of a refractive index profile 150A and an alkali metal concentration distribution 160A of the preform 100A along a line L (line orthogonal to central axis AX) in FIG. 1A. As can be seen from FIG. 1B, in the present embodiment, each core part 110 of the preform 100A is an alkali metal doped region in which alkali metal is doped.

Figure 1C:
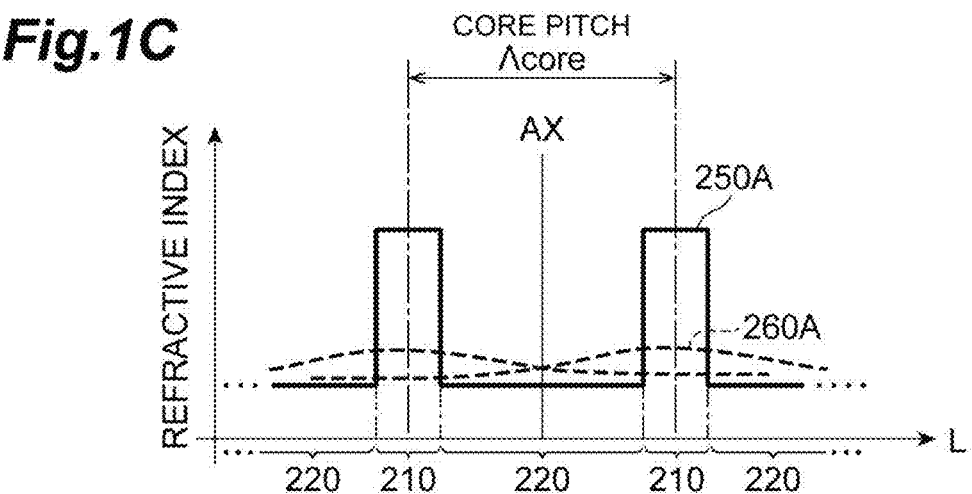

FIG. 1C is a diagram of a refractive index profile 250A and an alkali metal concentration distribution 260A of the MCF 200A according to the present embodiment obtained by drawing the preform 100A, and similarly to FIG. 1B, FIG. 1C is a profile along the line L in FIG. 1A.

Normally, in the preform 100A including the plurality of core parts 110 in which alkali metal is dopped, the alkali metal in each core part 110 is mutually diffused by being heated during drawing. Therefore, as illustrated in FIG. 1C, the alkali metal concentration in each core 210 in the MCF 200A after drawing decreases. However, when the core pitch $\Lambda_{core}$ becomes shorter, the alkali metal diffused from a certain core flows into the adjacent core so that reduction in the concentration of the alkali metal is eased and relaxation of a glass structure can be promoted. Therefore, in the MCF 200A according to the present embodiment, a transmission loss can be reduced. At this time, to efficiently diffuse the alkali metal between the cores 210, it is preferable that the distance between the cores be short. On the other hand, in a case where the inter-core XT is large, the transmission loss due to the inter-core XT is increased.

Figure 2:
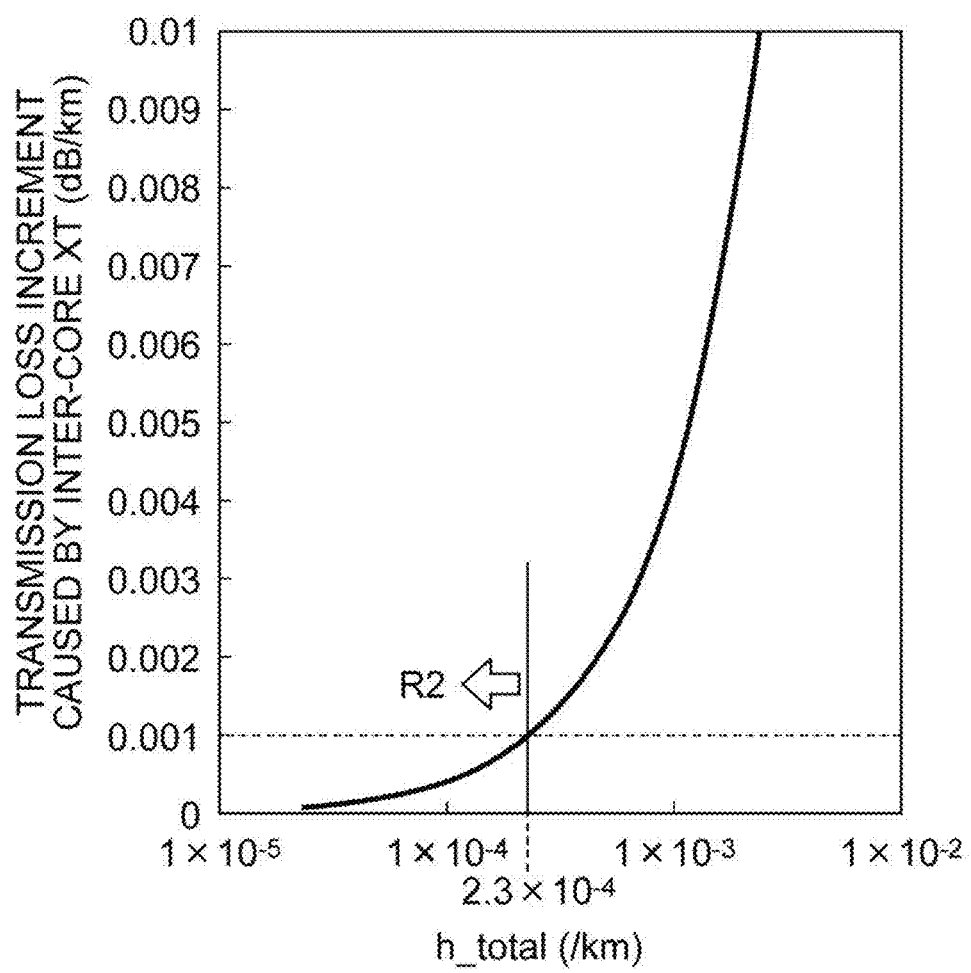
FIG. 2 is a graph of a relationship between h_total (/km) which is a sum of power coupling coefficients and a transmission loss increment (dB/km) caused by an inter-core XT.
Figure 3A:
FIGS. 3A to 3G are diagrams of various refractive index profiles applicable to a region R1 including the core and a part of a cladding around the core.
Figure 3B:
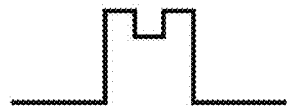
Figure 3C:
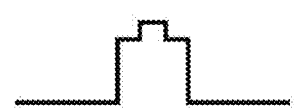
Figure 3D:
Figure 3E:
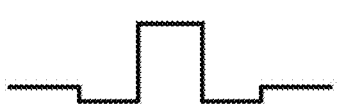
Figure 3F:
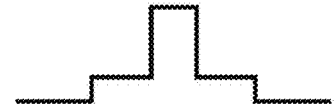
Figure 3G:
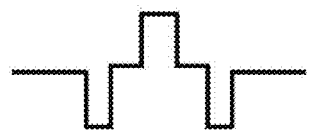

FIG. 2 is a graph of a relationship between h_total (/km) which is a sum of power coupling coefficients of a specific core and all the remaining cores of the plurality of cores included in the MCF and a transmission loss increment (dB/km) caused by the inter-core XT. As described in Non-Patent Document 3, optical power Pn for moving from a core m to a core n around the unit length can be expressed by the following formula (1).

$$dP_n/dz = h(P_m - P_n) \tag{1}$$

Here, the reference h is the power coupling coefficient. h_total used in the present embodiment is the total sum of an efficiency of the optical power coupling from all the other cores to a single core.

As can be seen from FIG. 2, by setting the core pitch so that the sum h_total of the power coupling coefficients between the cores is $2.3 \times 10^{-4}$/km, a leakage loss caused by the XT from one core to the other core can be suppressed to a value of 0.001 dB/km or less. That is, a region R2 illustrated in FIG. 2 represents a good range of the sum h_total of the power coupling coefficients that can effectively suppress the increase in the inter-core XT. More preferably, by setting the core pitch $\Lambda_{core}$ so that the sum h_total of the power coupling coefficients is $1.2 \times 10^{-4}$/km or less, the leakage loss caused by the inter-core XT from the core to the other core can be suppressed to a value of 0.0005 dB/km less. In this case, the reduction in the transmission loss due to the addition of the alkali metal depends on a drawing condition, for example, the concentration of the alkali metal such as potassium. However, reduction in the transmission loss of approximately 0.01 dB/km or more can be obtained.

The additive concentration of the alkali metal in the core part 110 in the preform 100A before drawing is set so that the average concentration of alkali metal in each core 210 in the MCF 200A after drawing is 0.2 atom ppm or more and 50 atom ppm or less. This is because since crystallization of $SiO_2$ glass in which high concentration alkali metal has been doped is promoted, the relaxation of the glass structure of the core 210 can be promoted during drawing if the average value of the alkali metal included in each core 210 of the MCF 200A after drawing is 0.2 atom ppm or more. On the other hand, when the average concentration of the alkali metal of the core 210 in the MCF 200A after drawing becomes 50 atom ppm or more, the transmission loss at the wavelength of 1550 nm after irradiation with radiation having a cumulative absorbed dose of 0.10 Gy or more is increased by 0.02 dB/km or more in comparison with that before the irradiation of the radiation, and this causes a problem in use in a system requiring stability of long-term transmission loss, such as a submarine system. Therefore, this is undesirable.

In a case where a halogen element concentration in the core part 110 of the preform 100A is low, an effect to remove impurities by the halogen element in a preform manufacturing process cannot be sufficiently obtained, and the transmission loss is increased due to absorption of the impurities. On the other hand, in a case where the amount of the halogen element is too large, a halogen compound of alkali metal is generated and acts as a nucleus for crystal. Therefore, this is undesirable. By setting the concentration of the halogen element such as Cl and F within a range of 1000 atom ppm to 3000 atom ppm, an MCF with a low transmission loss can be obtained without the above problem.

In addition, a concentration of alkali metal on a glass surface (surface of cladding 220) of the MCF 200A after drawing is one atom ppm or less. When the alkali metal is diffused to the glass surface of the MCF 200A after drawing, a mechanical fatigue coefficient is greatly decreased due to a cutting effect of a $SiO_2$ glass network of the alkali metal. Therefore, this causes a practical problem and is undesirable. To avoid the problem, the concentration of the alkali metal to the glass surface of the MCF 200A after drawing is preferably one atom ppm or less, and more preferably 0.1 atom ppm or less. In a case where potassium as an alkali metal is doped in the core part 110 of the preform 100A, potassium is diffused in a range of a radius of 15 to 50 μm after drawing. The diffusion radius depends on a potassium concentration at the preform stage and a temperature history during drawing. Therefore, it is desirable to determine a potassium addition position with respect to the core part 110 or the cladding part 120 in the cross section of the preform 100A after checking a potassium arrival distance after drawing in advance.

Specifically, the average concentration of the alkali metal element (for example, potassium) to be doped in the core part 110 of the preform 100A to reduce the transmission loss is five atom ppm or more, and suitably, 50 atom ppm or less. The higher the potassium concentration is, the more the loss due to the irradiation increases. Therefore, it is preferable that the upper limit of the potassium average concentration in the core part 110 at the preform stage be 500 atom ppm.

In the drawing process from the preform 100A to the MCF 200A, the time in which each position of the preform 100A is held at the 1500° C. or higher in a drawing furnace is 110 minutes or shorter. A drawing speed (spinning speed) is preferably 1200 m/min or more, and more preferably 1500 to 2300 m/min. It is preferable that the diameter of the preform 100A be 70 to 170 mmφ, and more preferably, 90 to 150 mmφ.

The shorter the time at which the position of the preform 100A is held at the 1500° C. or higher is, the smaller the transmission loss of the MCF 200A after drawing at the wavelength of 1.55 μm is. The reason why this phenomenon is caused is considered as follows. That is, in a case where potassium with an average concentration of 500 atom ppm or less is included in the core part 110 of the preform 100A, a fictive temperature of the MCF 200A obtained from the preform 100A is 1400 to 1550° C., and the diffusion of potassium proceeds in the time from a peak temperature (1500° C. or higher) to 1500° C. in the drawing furnace. On the other hand, when the diffusion of potassium proceeds too much, potassium widely diffuses to the outside of the optical power distribution in a communication wavelength band (1550 nm band). In this case, since an effective potassium concentration is lowered, the structural relaxation of the glass network does not proceed, and the transmission loss is not reduced. Therefore, an optical transmission loss of the MCF 200A after drawing is reduced as the time in which the preform is held at a glass temperature of 1500° C. or higher becomes shorter.

An alkali metal concentration of 0.2 atom ppm or more can be suitably realized in each core 210 of the MCF 200A after drawing by drawing from the preform 100A to the MCF 200A under such conditions. In a case where the MCF has the core which is substantially pure silica glass, to make the transmission loss fall below 0.170 dB/km, it is necessary for the time at which each position of the preform is held at a temperature of 1500° C. or higher to be 110 minutes or shorter, and it is more preferable that the time be 70 minutes or shorter.

In addition, the present embodiment can be obtained by suitably combining with annealing drawing which can maintain the temperature of the MCF during drawing to be equal to or more than a certain temperature and can promote the relaxation of the glass structure. In a case where the present embodiment is combined with the annealing drawing, a further lower transmission loss can be obtained. Regarding the method of the annealing drawing, those skilled in the art can obtain appropriate manufacturing conditions necessary for reducing the transmission loss.

Here, "atom ppm" indicating the alkali concentration and the halogen concentration is the number of dopant atoms in the $SiO_2$ glass of one million units. For example, in a case of potassium, the ratio of the number of K atoms and the number of $SiO_2$ molecules is indicated regardless of a bonding form in the $SiO_2$ glass. In a case of Li, Na, Rb, Cl, and F, the same can be applied.

As illustrated in FIGS. 3A to 3G, various refractive index profiles can be applied to the region R1 (refer to FIG. 1A) including each core 210 and a part of the cladding 220 around the core 210 of the MCF 200A having the above structure.

Regarding the refractive index profile of each core 210 and optical characteristics associated therewith, an appropriate structure can be selected according to the application. However, the structures of the respective cores 210 may be uniform or may be different from each other. The number of cores in the cross section of the MCF 200A is not limited, and the cross-sectional diameter (glass diameter) of the MCF 200A and the outer diameter of coating resin provided on the outer circumferential surface of the cladding 220 can be appropriately set according to the number of the stored cores.

Specifically, as a shape of the refractive index profile of the region R1 including the cores 210, a step type (FIG. 3A), a ring type (FIG. 3B), a double step type (FIG. 3C), and a graded type (FIG. 3D) can be applied to the region corresponding to the core 210. Any one of a depressed type (FIG. 3E), a matched type (FIG. 3F), and trench type (FIG. 3G) can be applied to the region corresponding to the cladding 220. In addition, each core 210 may have a structure with a single mode operation of which the number of modes for propagating in the core is one and a structure with a multimode operation for propagating in the core in multiple modes.

In the refractive index profile as described above, in a case where the structure is applied in which at least some of the cores 210 is made of $SiO_2$ glass in which the addition amount of GeO2 molecules is 1 wt % or less and fluorine is doped in the cladding 220, the transmission loss at the wavelength of 1550 nm in the core 210 is preferably 0.17 dB/km or less. Generally, in a case where the core is formed of $SiO_2$ glass to which $GeO_2$ molecules for increasing the refractive index of the core are not substantially doped, it is possible to suppress the transmission loss to be 0.17 dB/km or less since scattering caused by a concentration fluctuation of the $GeO_2$ molecules can be suppressed. A more preferable transmission loss is 0.165 dB/km or less.

In addition, in the refractive index profile as described above, a structure in which germanium is doped in at least some of the cores 210 may be employed. In this case, the transmission loss of each core at the wavelength of 1550 nm is preferably 0.18 dB/km or less. The core in which germanium has been doped generally has higher transmission loss than an optical fiber having a pure silica core. However, the scattering can be reduced by co-doping the alkali metal with the core. As a result, the transmission loss can be reduced. However, when the alkali metal is doped in the core part in which germanium has been doped at the preform stage, crystals are likely to be generated in the core after drawing. Therefore, productivity is deteriorated. Therefore, it is desirable that, in the preform manufacturing process, the alkali metal is not directly doped in the core part in which germanium has been doped, and the alkali metal is doped in the cladding part of the preform, and the alkali metal is diffused to the core according to the heating time at the time of drawing.

Next, optical characteristics of the plurality of samples and a comparative example of the MCF 200A according to the present embodiment are described in detail below with reference to FIGS. 4A to 4C, 5A to 5C, and 6.

Figure 4A:
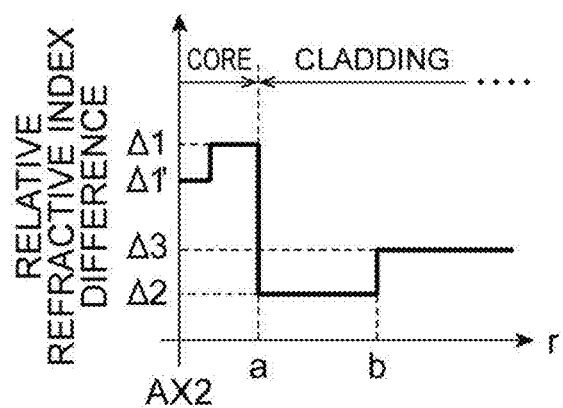
FIGS. 4A to 4C are diagrams of a refractive index profile and sectional structures of the region R1 including the core and a part of the cladding around the core in two samples 1 and 2 of the MCF according to the first embodiment (MCF 1 and MCF 2) and a comparative example (SCF).
Figure 4B:
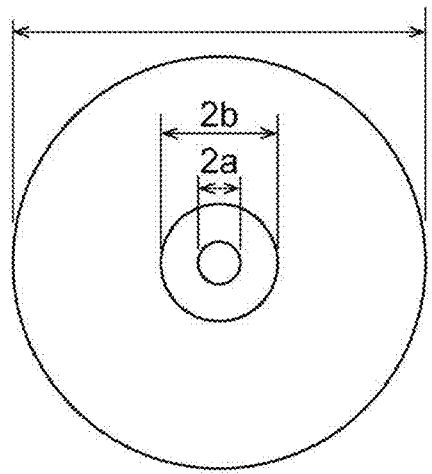
Figure 4C:
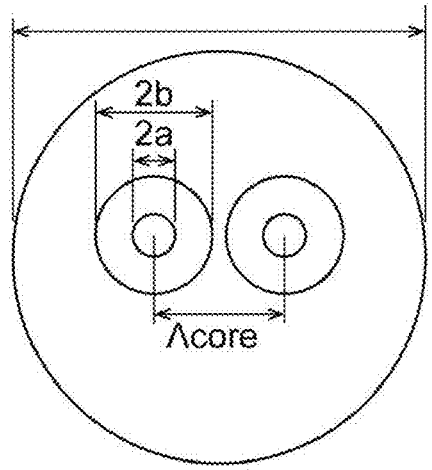

As the prepared samples of the MCF 200A according to the present embodiment, each of a MCF 1 (sample 1) and a MCF 2 (sample 2) has a cross-sectional structure having two cores as illustrated in FIG. 4C. The periphery of each core has the refractive index profile (ring type core+trench part) illustrated in FIG. 4A. On the other hand, the comparative example is a single core optical fiber (hereinafter referred to as SCF) having one core as illustrated in FIG. 4B, and the periphery of the core has the refractive index profile illustrated in FIG. 4A.

In each of the MCF 1 which is the sample 1, the MCF 2 which is the sample 2, and the SCF which is the comparative example, while assuming the pure silica as a reference, a relative refractive index difference $\Delta 1$ is 0.05%, $\Delta 1'$ is −0.05%, $\Delta 2$ is −0.5%, $\Delta 3$ is −0.25%, the core diameter $2a$ is 12.51 μm, and the outer diameter $2b$ of the trench part is 34.61 μm. The core pitch $\Lambda_{core}$ of the MCF 1 is 40.7 μm, and the core pitch $\Lambda_{core}$ of the MCF 2 is 36.6 μm. Regarding each of the MCF 1, the MCF 2, and the comparative example SCF, a fiber outer diameter is 125 μm, and a drawing speed is 1500 m/min and a drawing tension is 80 to 100 g in drawing conditions.

Regarding each of the MCF 1 ($\Lambda_{core}$=40.7 μm), the MCF 2 ($\Lambda_{core}$=36.6 μm) and the SCF created as described above, an average effective area $A_{eff}$ of each core at a wavelength of 1550 nm has been 110 μm$^2$. The average potassium concentration in each core after drawing has been one atom ppm.

FIGS. 5A to 5C are charts of the optical characteristics of the MCF 1, the MCF 2, and the SCF. In FIG. 5A, as the optical characteristics of each of the MCF 1, the MCF 2, and the SCF at the wavelength of 1550 nm, the inter-core XT (dB) at a fiber length of 100 km, the sum of power coupling coefficients h_total (/km), and the transmission loss (dB) caused by the inter-core XT are illustrated. In FIG. 5B, as the optical characteristics of each of the MCF 1, the MCF 2, and the SCF at the wavelength of 1625 nm, the inter-core XT (dB) at a fiber length of 100 km, the sum of power coupling coefficients h_total (/km), and the transmission loss (dB) caused by the inter-core XT are illustrated. In FIG. 5C, the transmission loss (dB/km) at the wavelength of 1550 nm of the MCF 1, the MCF 2 and the SCF and the amount of the transmission loss reduction (dB/km) at the wavelength of 1550 nm are illustrated. Here, the inter-core XT (dB) at the fiber length of 100 km is a measured value of the XT amount at each wavelength after the propagation of 100 km, and the sum h_total is calculated by using the measured value. The transmission loss (dB) caused by the inter-core XT is calculated from h_total. The amount of the transmission loss reduction (dB/km) at the wavelength of 1550 nm indicates the amounts of the transmission loss reduction of the MCF 1 and the MCF 2 with respect to the SCF which is the comparative example.

As can be seen from FIGS. 5A to 5C, the transmission loss of the SCF at the wavelength of 1550 nm has been 0.161 dB. On the other hand, the transmission loss of the MCF 1 manufactured under the same drawing condition at the wavelength of 1550 nm has been 0.158 dB, and the transmission loss of the MCF 2 at the wavelength of 1500 nm has been 0.157 dB. At the wavelength of 1550 nm, it is considered that the transmission losses caused by the inter-core XT of the MCF 1 and the MCF 2 are respectively increased by $6.9 \times 10^{-5}$ dB/km and $9.8 \times 10^{-4}$ dB/km. However, the transmission losses of the MCF 1 and the MCF 2 at the wavelength of 1550 nm are significantly decreased with respect to the SCF as described above. It can be confirmed that an effect of the transmission loss reduction between the cores can be obtained by arranging the plurality of cores, in which the alkali metal has been doped, adjacent to each other.

Figure 6:
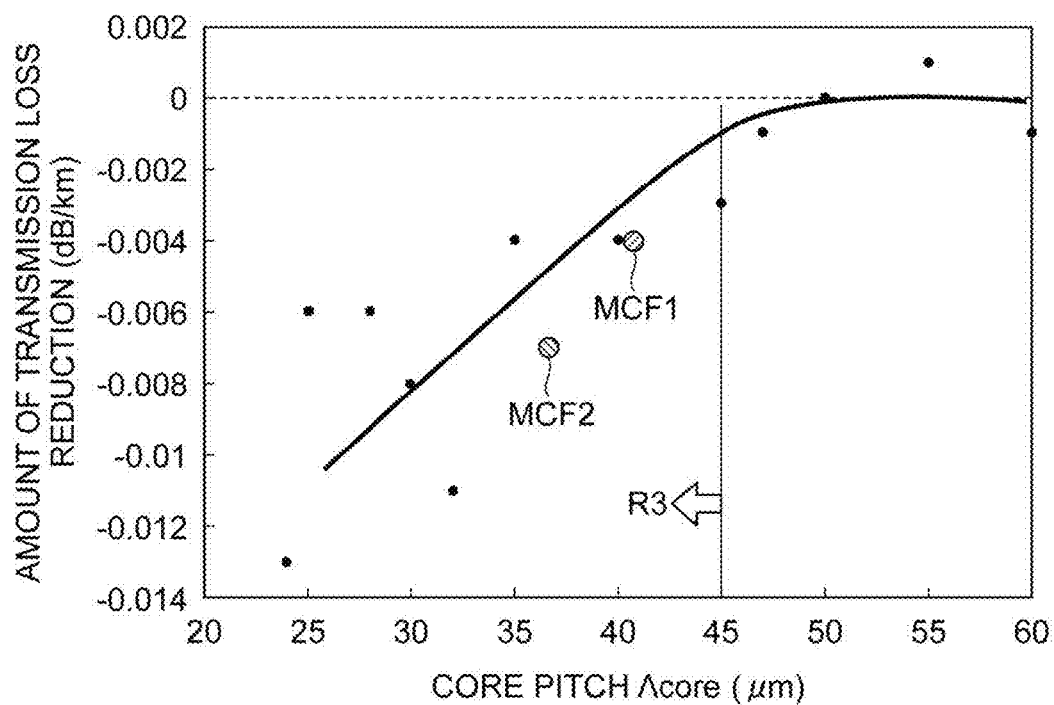
FIG. 6 is a graph of a relationship between a core pitch $\Lambda_{core}$ and transmission loss reduction (dB/km) for the two samples 1 and 2 according to the first embodiment (MCF 1 and MCF 2).

FIG. 6 is a graph of a relationship between a core pitch $\Lambda_{core}$ and the amount of the transmission loss reduction (dB/km) of the MCF 1 (sample 1) and the MCF 2 (sample 2). Specifically, the amount of the transmission loss reduction (dB/km) is the amount of the transmission loss reduction of each of the MCF 1 and the MCF 2 relative to the transmission loss of the SCF which is the comparative example. The SCF can be obtained by drawing a preform having a single core part in which 25 atom ppm of potassium elements have been doped. On the other hand, each of the MCF 1 and the MCF 2 can be obtained by drawing a preform in which potassium elements of 25 atom ppm as an average concentration have been doped in two core parts.

Even if the preform in which the alkali metal has been doped in the core part as described above is spun, in a case where the distance between the cores in the obtained MCF is long, the alkali metals do not mutually diffuse between the cores during drawing, and the transmission loss cannot be efficiently reduced. As illustrated in FIG. 6, it can be confirmed that the transmission loss can be more reduced than the SCF when the core pitch $\Lambda_{core}$ is 45 µm or less. To reduce the transmission loss, it is preferable that the core pitch $\Lambda_{core}$ be 40 µm or less, and more preferably, 35 µm or less. In this way, it is preferable that the core pitch $\Lambda_{core}$ be smaller. A region R3 illustrated in FIG. 6 indicates a preferable range of the core pitch $\Lambda_{core}$ that can sufficiently reduce the transmission loss. On the other hand, in a case where a substance having an atomic number equal to or less than that of potassium (K) is used as the alkali metal, a diffusion coefficient is larger than that of K. Therefore, if the core pitch $\Lambda_{core}$ is still 45 µm or less, the alkali metal during drawing can be mutually diffused between the cores. In a case where alkali metal having an atomic number larger than that of potassium is used, since the diffusion speed becomes slow, it is desirable that the core pitch $\Lambda_{core}$ be further smaller. However, in this case, it is necessary to design a refractive index profile structure of the core so that the sum h_total of the power coupling coefficients between the cores becomes $2.3 \times 10^{-4}$/km or less.

In a general transmission system, it is desirable that the inter-core XT be −30 dB or less to maintain a signal quality. On the other hand, as illustrated in FIG. 6, as the pitch between the cores in which the alkali metal has been doped is narrowed, the transmission loss can be efficiently reduced. As compared with a case where signals are propagated in the same direction, in a case where the signals are counter-propagated, the effective XT becomes lower. Therefore, an allowable value of the XT value between the adjacent cores can be relaxed. That is, to obtain the inter-core XT of substantially −30 dB or less from the reflectance of 4% (about −14 dB) of air and glass, it is preferable that the inter-core XT be −16 dB/km in the wavelength used in the system and in the transmission distance, and the core pitch can be relaxed.

The MCF 2 has an inter-core XT of 16.5 dB which is a relatively large inter-core XT after the propagation of 100 km at the wavelength of 1550 nm. However, as a result of propagating the NRZ 40-Gbps signal in a state where the transmission directions of the adjacent cores are reversed to each other, error free transmission becomes available. Accordingly, as compared with the SCF having a single-core structure, in the MCF having a multicore structure, the alkali metal which has been doped in the cores adjacent to each other during drawing diffuses to the outside of the core. Therefore, the transmission loss in the common cladding part can be efficiently reduced.

(Second Embodiment)

Figure 7A:
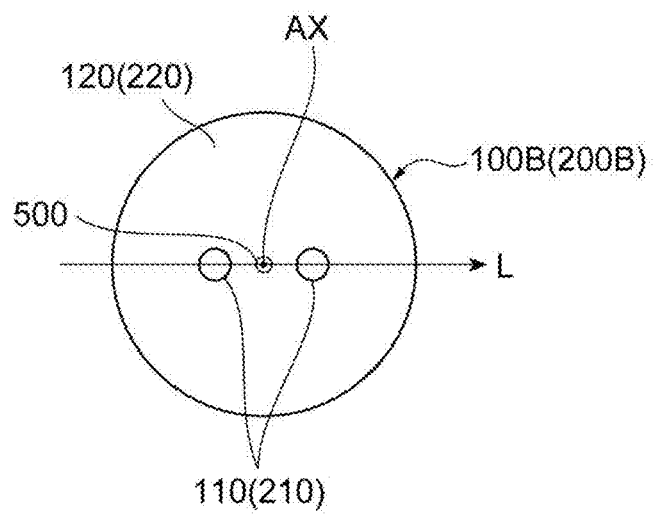
FIGS. 7A to 7C are diagrams of a sectional structure of a refractive index profile, and an alkali metal concentration distribution of a MCF and a preform according to a second embodiment.
Figure 7B:
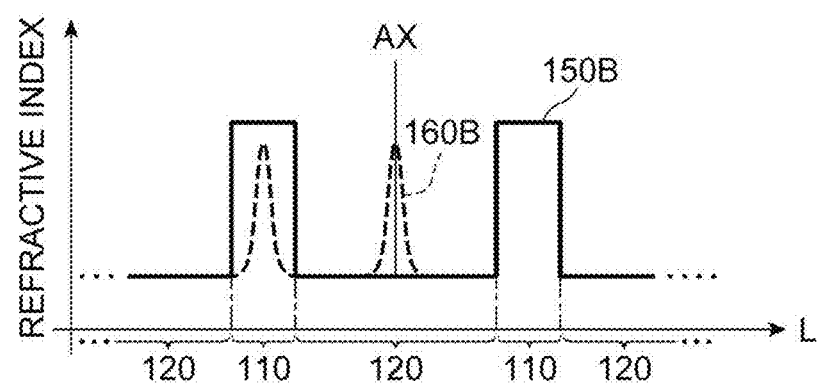
Figure 7C:
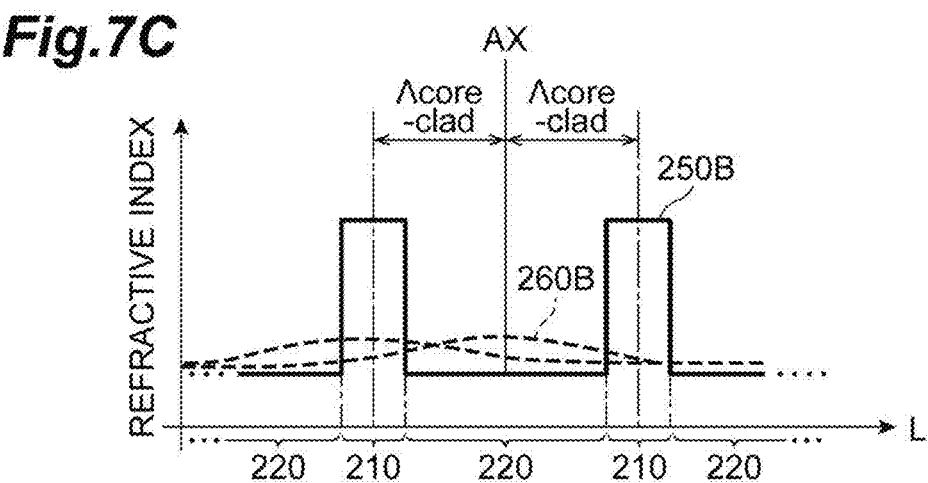

FIGS. 7A to 7C are diagrams of a sectional structure, a refractive index profile, and an alkali metal concentration distribution of a MCF 200B and a preform 100B according to a second embodiment. In the second embodiment illustrated in FIGS. 7A to 7C, in the preform 100B for manufacturing the MCF 200B, the structure is similar to that of the first embodiment (FIGS. 1A to 1C), except for a point that an alkali metal doped region 500 is provided in a cladding part 120 between core parts 110 in addition to the two core parts 110.

That is, in FIG. 7A, the preform 100B includes the core parts 110 respectively extending along a central axis AX and a cladding part 120 for covering each of the core parts 110. The MCF 200B according to the present embodiment is obtained by drawing the preform 100B, and a sectional structure thereof is similar to that of the preform 100B. A core 210 of the MCF 200B corresponds to the core part 110 of the preform 100B, and a cladding 220 of the MCF 200B corresponds to the cladding part 120 of the preform 100A. FIG. 7B is a diagram of a refractive index profile 150B and an alkali metal concentration distribution 160B of the preform 100B along a line L in FIG. 7A. As can be seen from FIG. 7B, in the present embodiment, the alkali metal doped region 500 in which the alkali metal is doped is formed in the cladding part 120 of the preform 100B. In FIG. 7B, the alkali metal concentration distribution is not illustrated in one of the core parts 110. However, naturally, the alkali metal doped regions may be formed in all the core parts 110 in the present embodiment. FIG. 7C is a diagram of a refractive index profile 250B and an alkali metal concentration distribution 260B of the MCF 200B according to the present embodiment obtained by drawing the preform 100B, and similarly to FIG. 7B, FIG. 7C is a profile along the line L in FIG. 7A. $\Lambda_{core-cladding}$ illustrated in FIG. 7C is a distance between a diffusion center position of the alkali metal doped region 500 provided in the cladding part 120 of the preform 100B and the center position of each core 210 of the MCF 200B after drawing.

According to the present embodiment, by adding the alkali metal to the cladding part 120 in addition to the core part 110 of the preform 100B, a transmission loss can be more efficiently reduced. However, in a case where a distance between the region in which the alkali metal has been doped and the core part 110 is long, the alkali metal does not diffuse into the core during drawing, and an effect of reduction in the transmission loss cannot be obtained. Therefore, in a case where a substance having an atomic number equal to or less than that of potassium (K) is used as the alkali metal, the distance $\Lambda_{core-cladding}$ between the center of the core 210 and the diffusion center position corresponding to the center of the alkali metal doped region 500 in the MCF 200B after drawing is required to be 45 µm or less. More preferably, the distance $\Lambda_{core-cladding}$ is 40 µm or less, and more preferably 35 µm or less.

In addition, when the alkali metal is doped in the core part 110 of the preform 100B, crystals are likely to be generated in the core during drawing, and the transmission loss may be increased due to mixture of impurities other than the alkali metal into the core part 110 in a process for adding the alkali metal to the core part 110. Therefore, by diffusing the alkali metal (alkali metal doped region 500) doped in the cladding part 120 in the drawing process to the core during drawing without directly adding the alkali metal to the core part 110 in the preform stage, a low transmission loss can be obtained without an excessive loss caused by crystallization and the mixture of the impurities, and reduction in a production yield.

Regarding an arrangement of the alkali metal doped regions in the core part 110 and the cladding part 120 in the preform 100B, the alkali metal doped regions are provided in both core parts 110 and an intermediate region thereof and are extended along the longitudinal direction (central axis AX) of the preform. With this structure, even if the core pitch $\Lambda_{core}$ is increased so as not to consider the problem of the inter-core XT, it is possible to reduce the transmission loss of the obtained MCF. However, in a case where alkali metal is provided in a region close to the outer periphery of the cladding, the concentration of the alkali metal at the outer periphery of a fiber is increased due to the diffusion during drawing, and the mechanical strength of the obtained MCF 200B is lowered. Therefore, this is not desirable. Therefore, it is preferable that the concentration of the alkali metal on the surface of the cladding 220 of the MCF 200B be one atom ppm or less.

REFERENCE SIGNS LIST 100A, 100B . . . preform; 110 . . . Core part (including alkali metal doped region); 120 . . . Cladding part; 150A, 150B, 250A . . . Refractive index profile; 160A, 160B, 260A, 260B . . . Alkali metal concentration distribution; 200A, 200B . . . MCF; 210 . . . Core; 220 . . . Cladding; and 500 . . . Alkali metal doped region.

The invention claimed is:

1. A multicore optical fiber of an uncoupled type, comprising:
a plurality of cores, each of the plurality of cores containing alkali metal having a concentration which contributes to reduction in a transmission loss, and a pitch of the plurality of cores being set so that a sum h_total of power coupling coefficients between a specific core of the plurality of cores and remaining all cores is $2.3 \times 10^{-4}$/km or less; and
a cladding covering each of the plurality of cores,
wherein the cladding includes a diffusion center position corresponding to a center position of an alkali metal doped region in a preform for the multicore optical fiber before spinning, and a distance Λcore-cladding between a diffusion center position and a center position of the core adjacent to the diffusion center position in the plurality of cores is 45 µm or less.

2. The multicore optical fiber according to claim 1, wherein the pitch is 45 µor less.

3. The multicore optical fiber according to claim 1, having an alkali metal concentration distribution of which at least one concentration peak is located within the cladding.

4. The multicore optical fiber according to claim 1, wherein each of the plurality of cores is comprised of $SiO_2$ glass and contains 1 wt % or less of $GeO_2$ molecules, the cladding contains fluorine, and each of the plurality of cores has a transmission loss of 0.17 dB/km or less at a wavelength of 1550 nm.

5. The multicore optical fiber according to claim 1, wherein the plurality of cores includes a core containing germanium and having a transmission loss of 0.18 dB/km or less at a wavelength of 1550 nm.

6. The multicore optical fiber according to claim 1, wherein an average concentration of alkali metal in each of the plurality of cores is 0.2 atom ppm or more and 50atom ppm or less.

7. The multicore optical fiber according to claim 1, wherein in a preform for the multicore optical fiber before spinning, an average concentration of halogen elements in each region corresponding to each of the plurality of cores is 1000 atom ppm or more and 30000 atom ppm or less.

8. The multicore optical fiber according to claim 1, wherein a concentration of the alkali metal on a surface of the cladding is one atom ppm or less.

* * * * *